March 26, 1963 K. J. LISSANT 3,083,232
POLYALKYLENE GLYCOL BLOCK POLYMERS
Original Filed May 12, 1960 13 Sheets-Sheet 1
FIGURE I
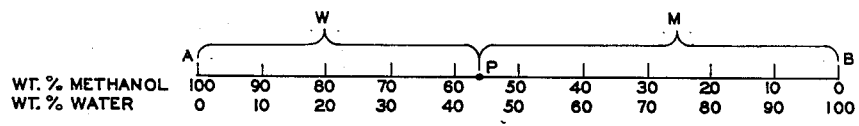
FIGURE II
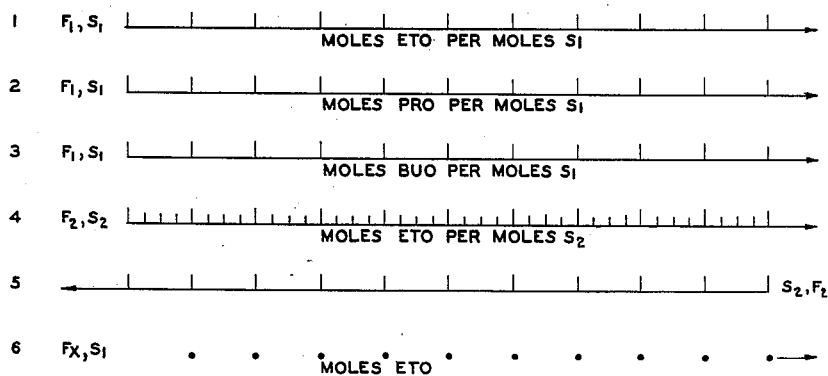
FIGURE III
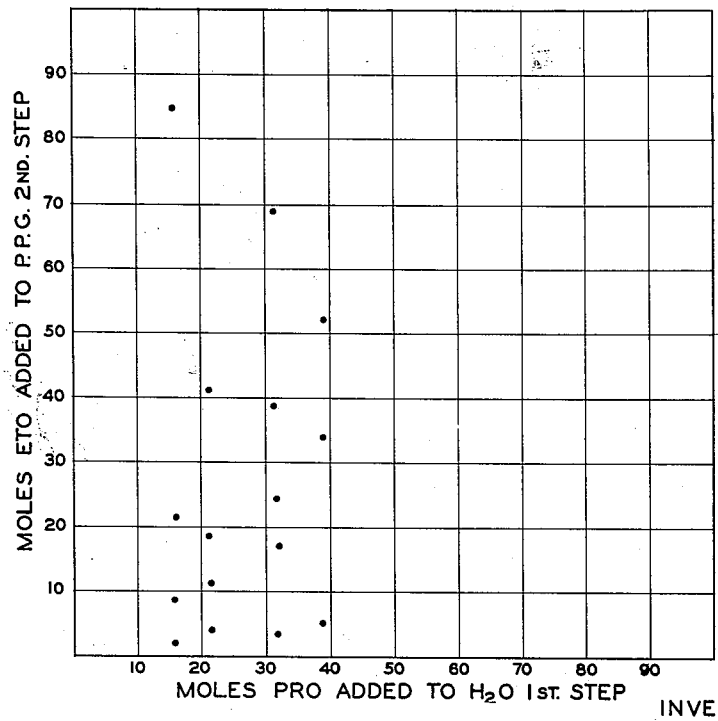
INVENTOR
KENNETH J. LISSANT

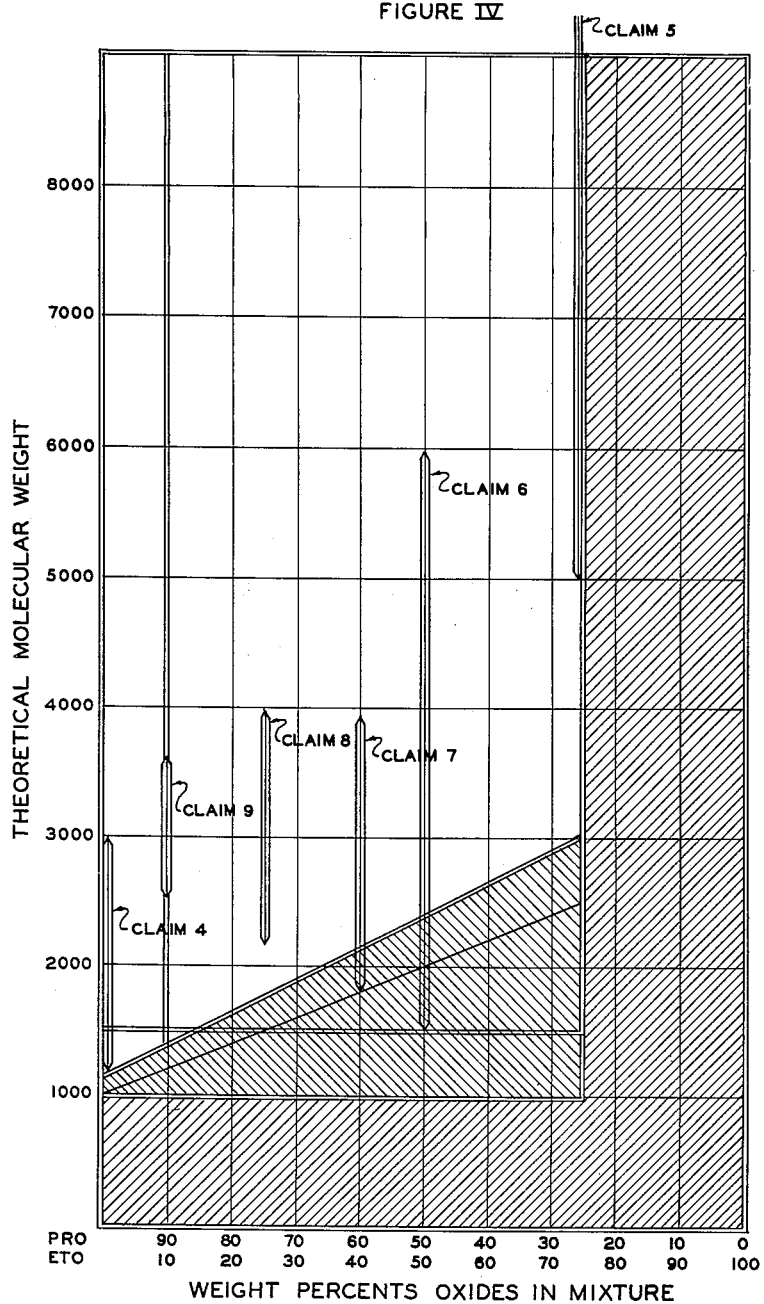

March 26, 1963 K. J. LISSANT 3,083,232
POLYALKYLENE GLYCOL BLOCK POLYMERS
Original Filed May 12, 1960 13 Sheets-Sheet 3
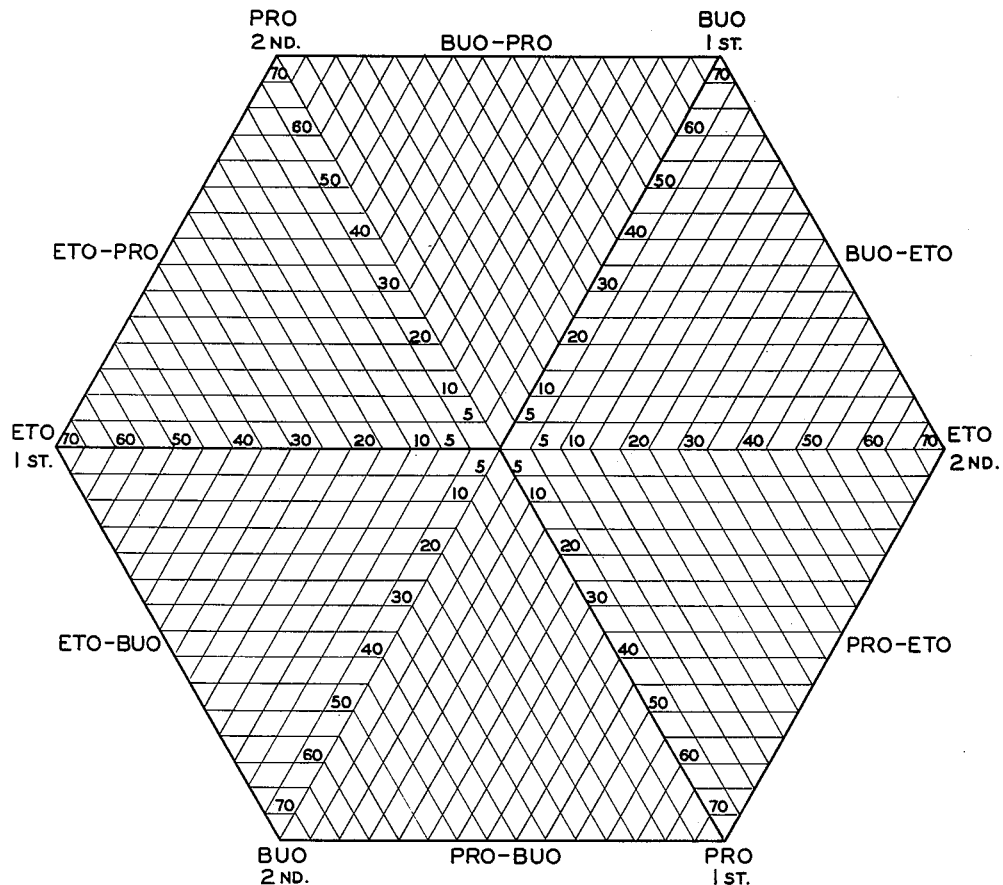
FIGURE X
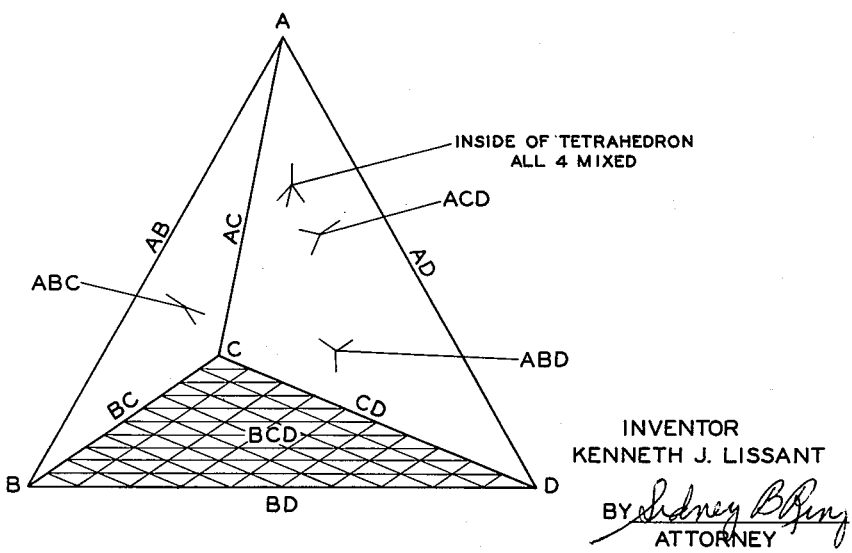
FIGURE XI
INVENTOR
KENNETH J. LISSANT
BY *Sidney B. Ring*
ATTORNEY March 26, 1963  K. J. LISSANT  3,083,232
POLYALKYLENE GLYCOL BLOCK POLYMERS
Original Filed May 12, 1960  13 Sheets-Sheet 4
FIGURE VI
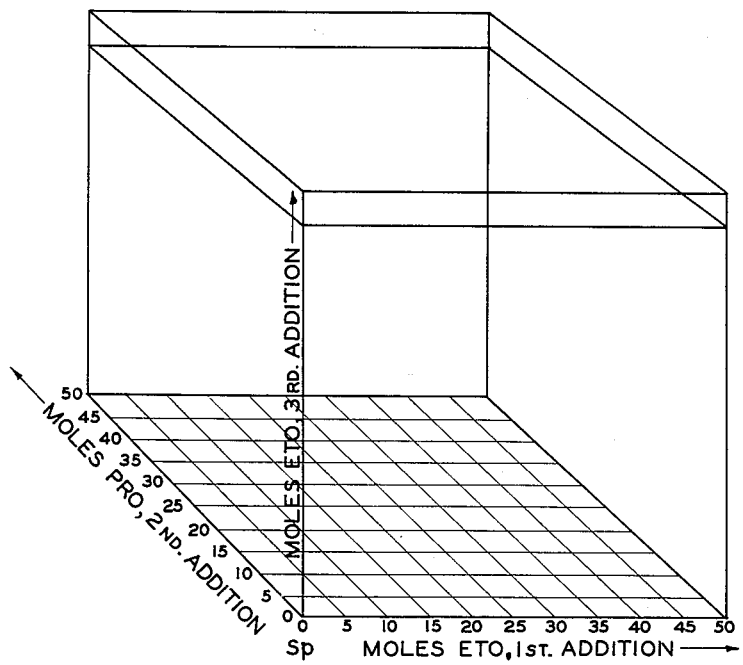
FIGURE IX
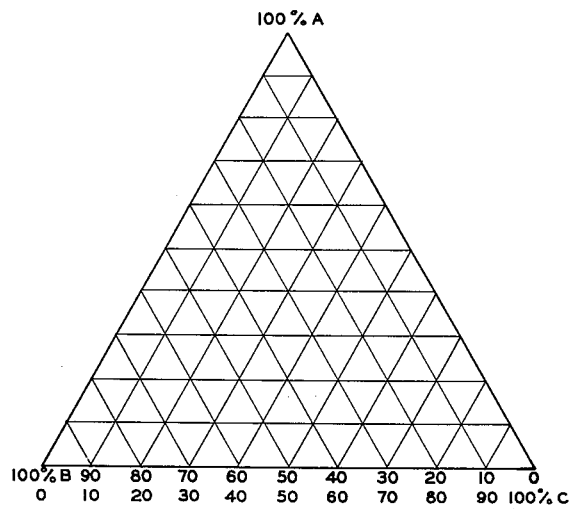
INVENTOR
KENNETH J. LISSANT
BY Sidney B. Ring
ATTORNEY March 26, 1963 K. J. LISSANT 3,083,232
POLYALKYLENE GLYCOL BLOCK POLYMERS
Original Filed May 12, 1960 13 Sheets-Sheet 5
FIGURE VII
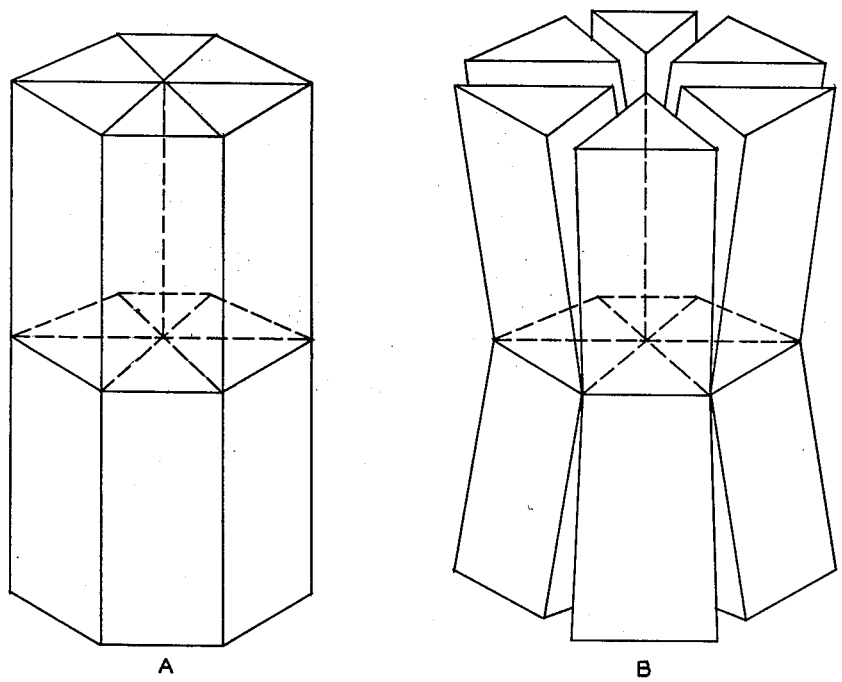
A  B
FIGURE VIII
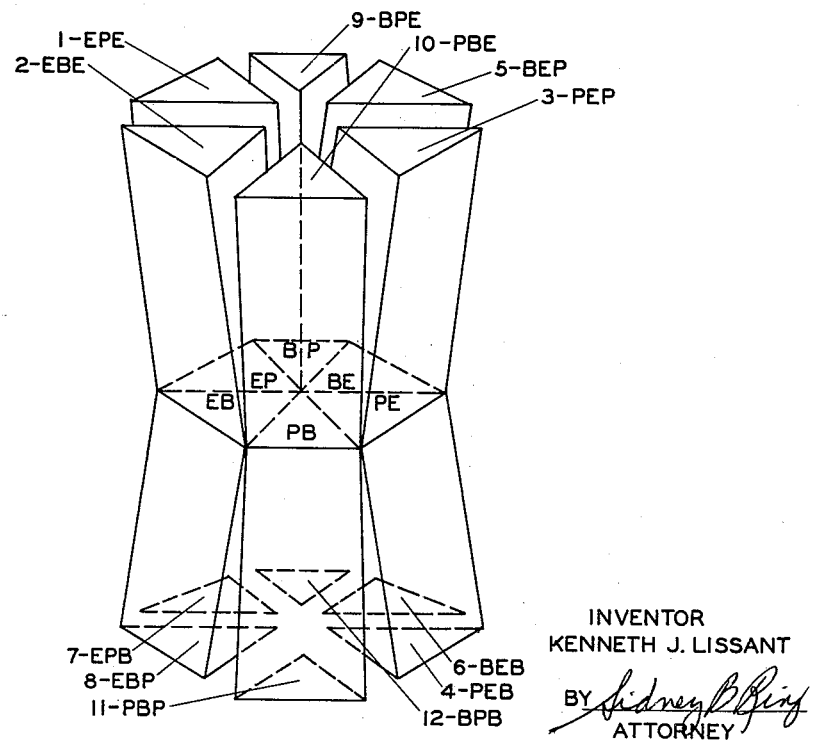
INVENTOR
KENNETH J. LISSANT
BY
ATTORNEY March 26, 1963 K. J. LISSANT 3,083,232
POLYALKYLENE GLYCOL BLOCK POLYMERS
Original Filed May 12, 1960 13 Sheets-Sheet 6
FIGURE X
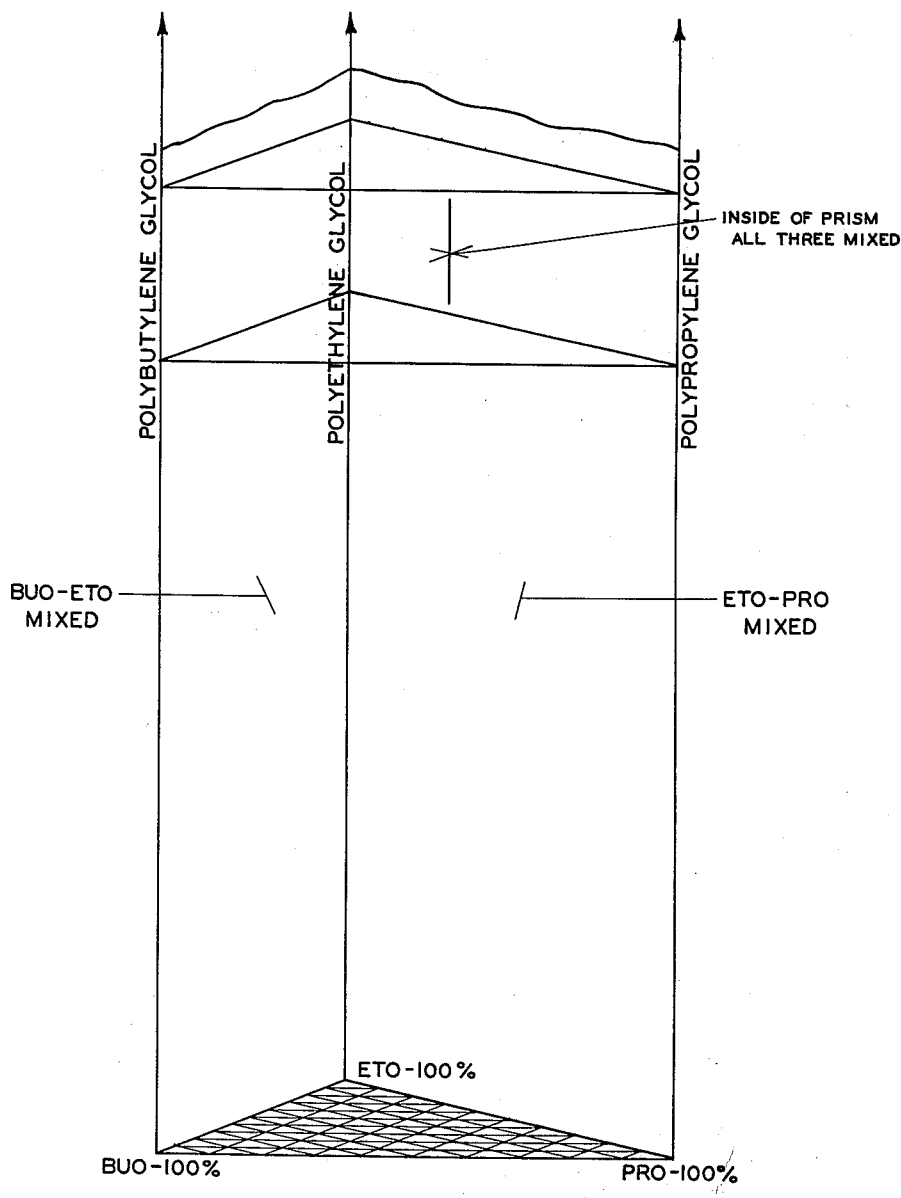
INVENTOR
KENNETH J. LISSANT
BY Sidney B. Ring
ATTORNEY

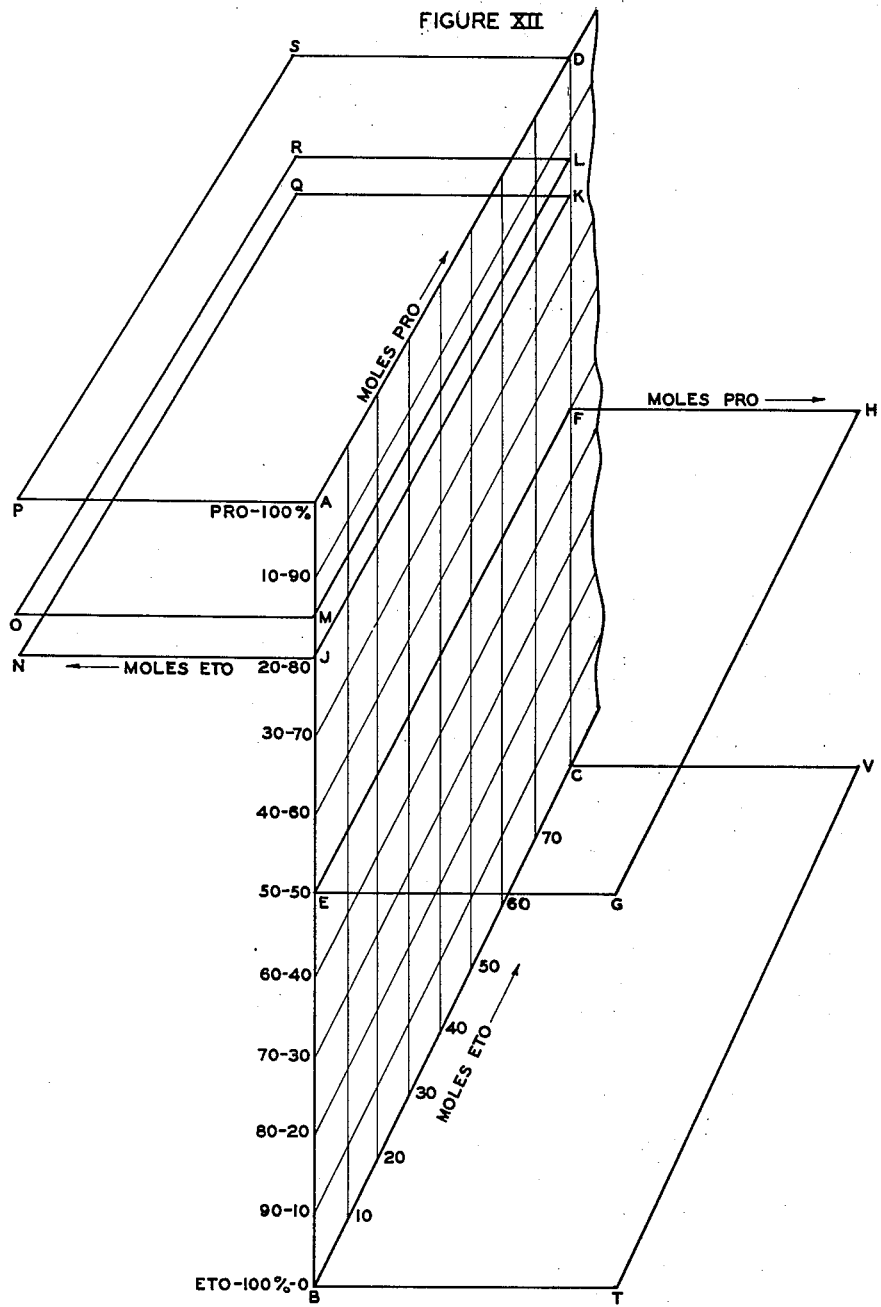
FIGURE XII

March 26, 1963  K. J. LISSANT  3,083,232
POLYALKYLENE GLYCOL BLOCK POLYMERS
Original Filed May 12, 1960  13 Sheets-Sheet 8
FIGURE XIII
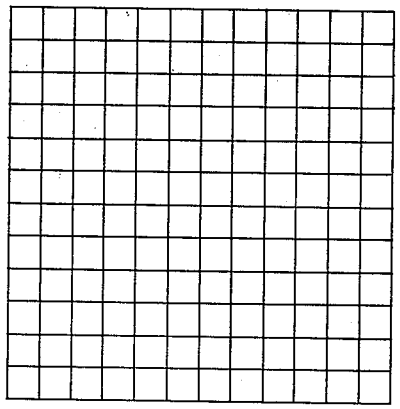
(A) RECTANGULAR GRID
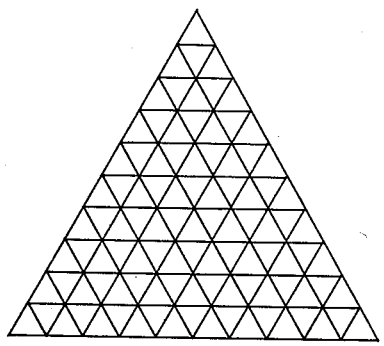
(B) TRIANGULAR GRID
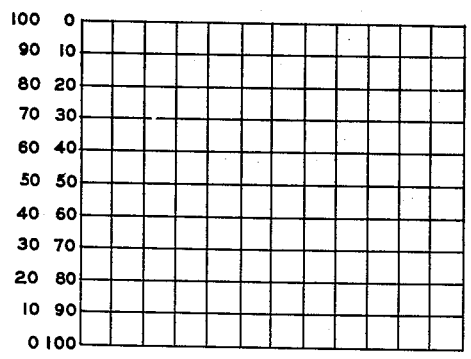
(C)
INVENTOR
KENNETH J. LISSANT
BY Sidney B. Ring
ATTORNEY March 26, 1963 K. J. LISSANT 3,083,232
POLYALKYLENE GLYCOL BLOCK POLYMERS
Original Filed May 12, 1960 13 Sheets-Sheet 9

FIGURE XIV
HEXAGONAL SOLUBILITY DATA SYMBOL

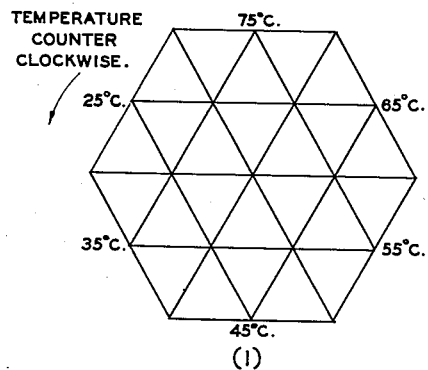

(1) TEMPERATURE COUNTER CLOCKWISE.

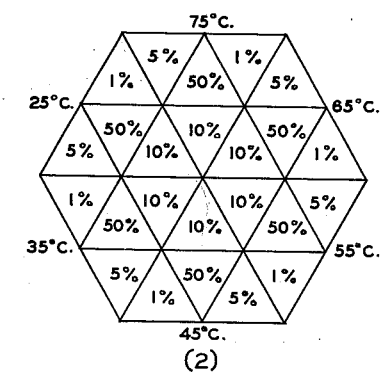

(2)

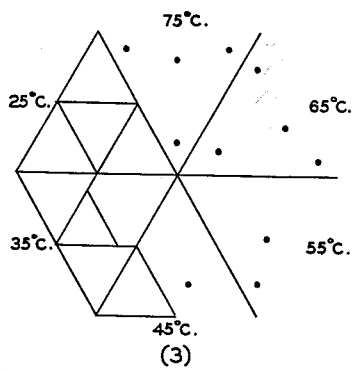

(3) TYPICAL EXAMPLE OF A COMPOUND THAT IS H₂O SOLUBLE AT LOW TEMPERATURES AND KEROSENE SOLUBLE AT HIGHER TEMPERATURES.

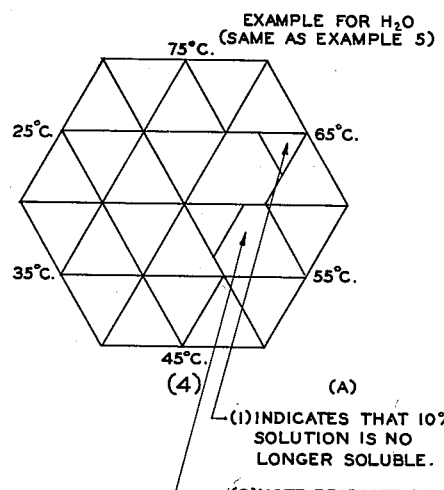

(4) EXAMPLE FOR H₂O (SAME AS EXAMPLE 5)

(A)
(1) INDICATES THAT 10% SOLUTION IS NO LONGER SOLUBLE.
(2) NOTE RECESSED LINE. THIS INDICATES THAT 50% SOLUTION IS NO LONGER SOLUBLE.

(B) DOTS ARE USED TO INDICATE SOLUBLE POINTS IN KEROSENE, TRIANGLES FOR H₂O.

(5) EXAMPLE FOR KEROSENE.

INVENTOR
KENNETH J. LISSANT
BY
ATTORNEY

March 26, 1963 K. J. LISSANT 3,083,232
POLYALKYLENE GLYCOL BLOCK POLYMERS
Original Filed May 12, 1960 13 Sheets-Sheet 10
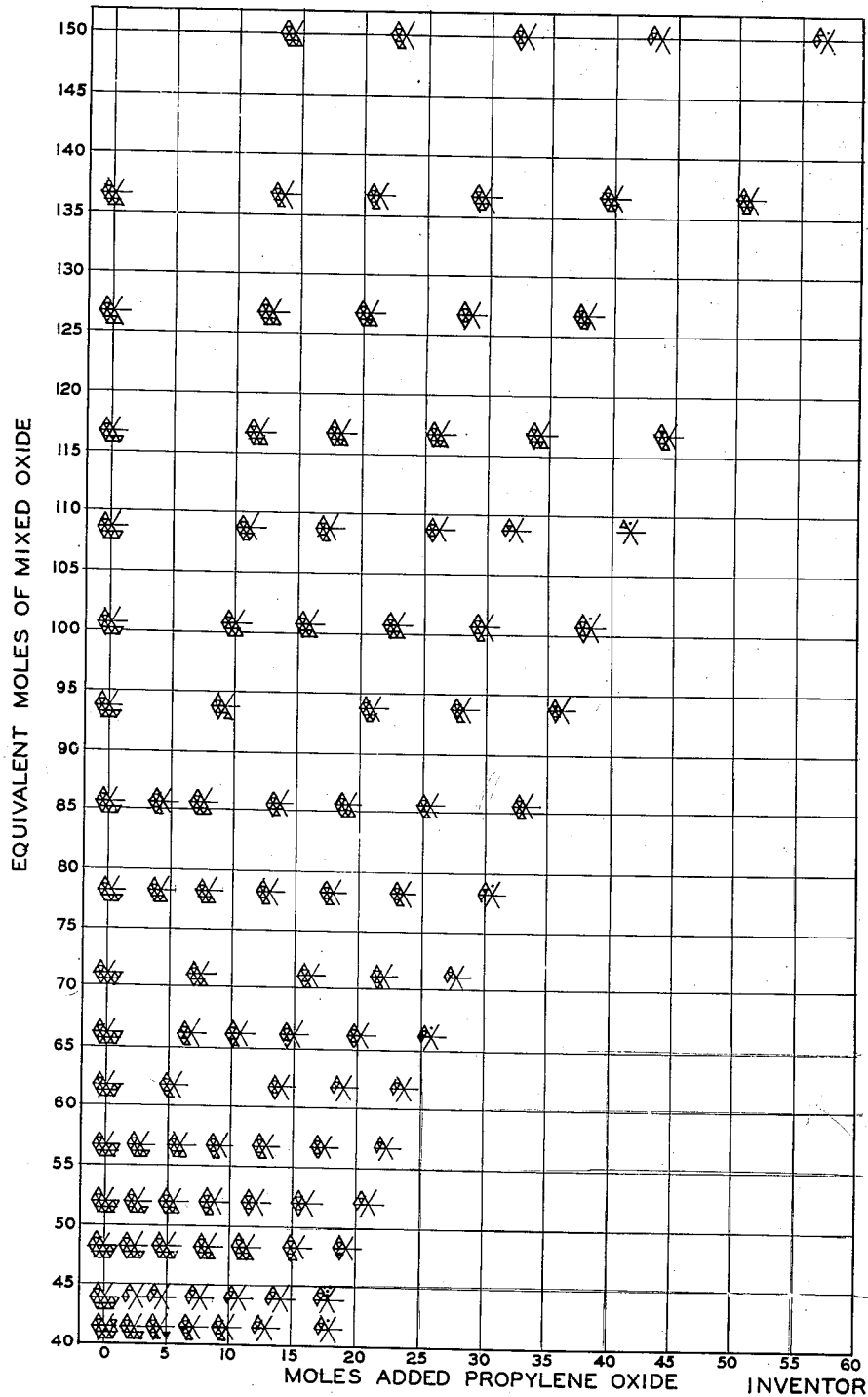
FIGURE XV

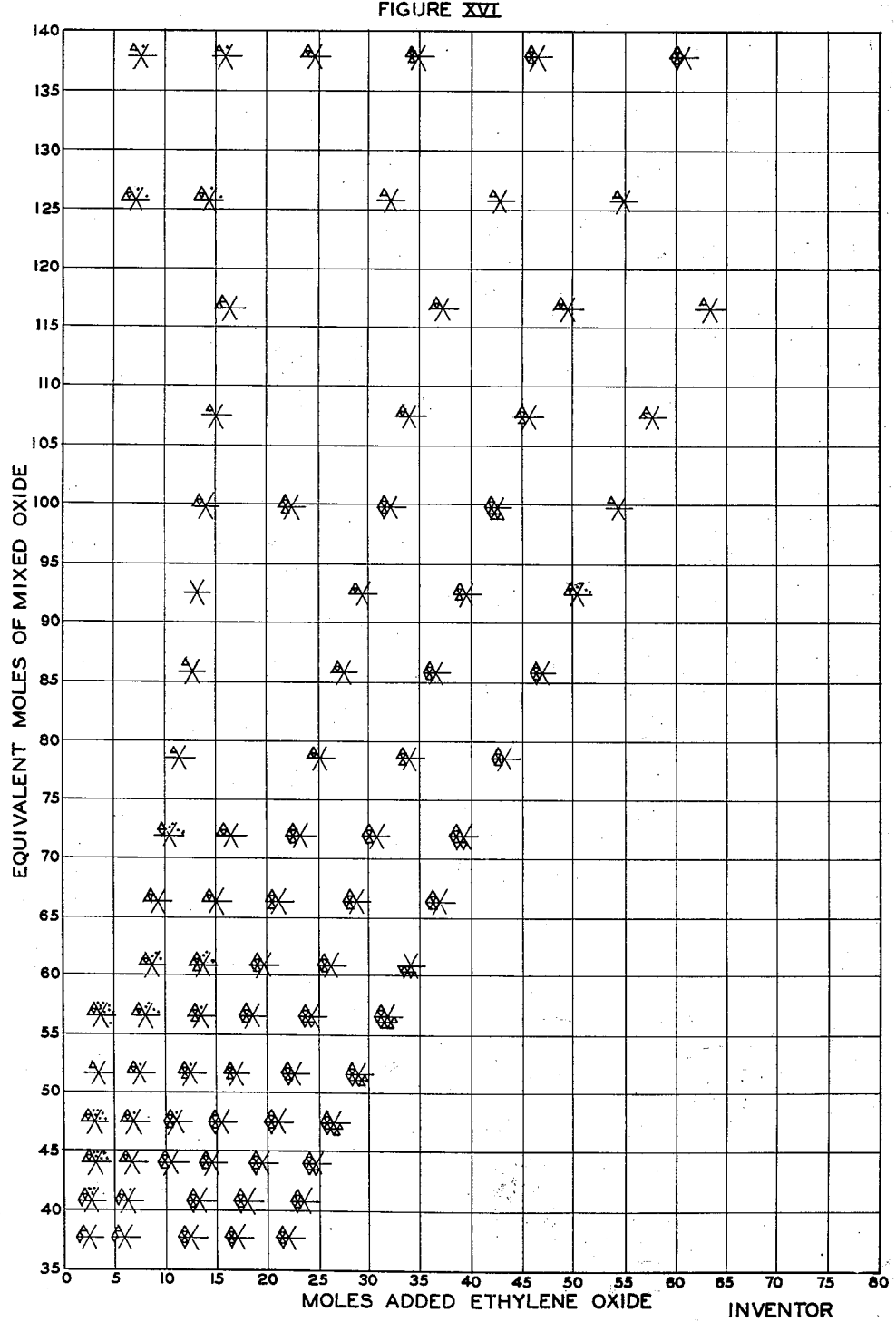
FIGURE XVI

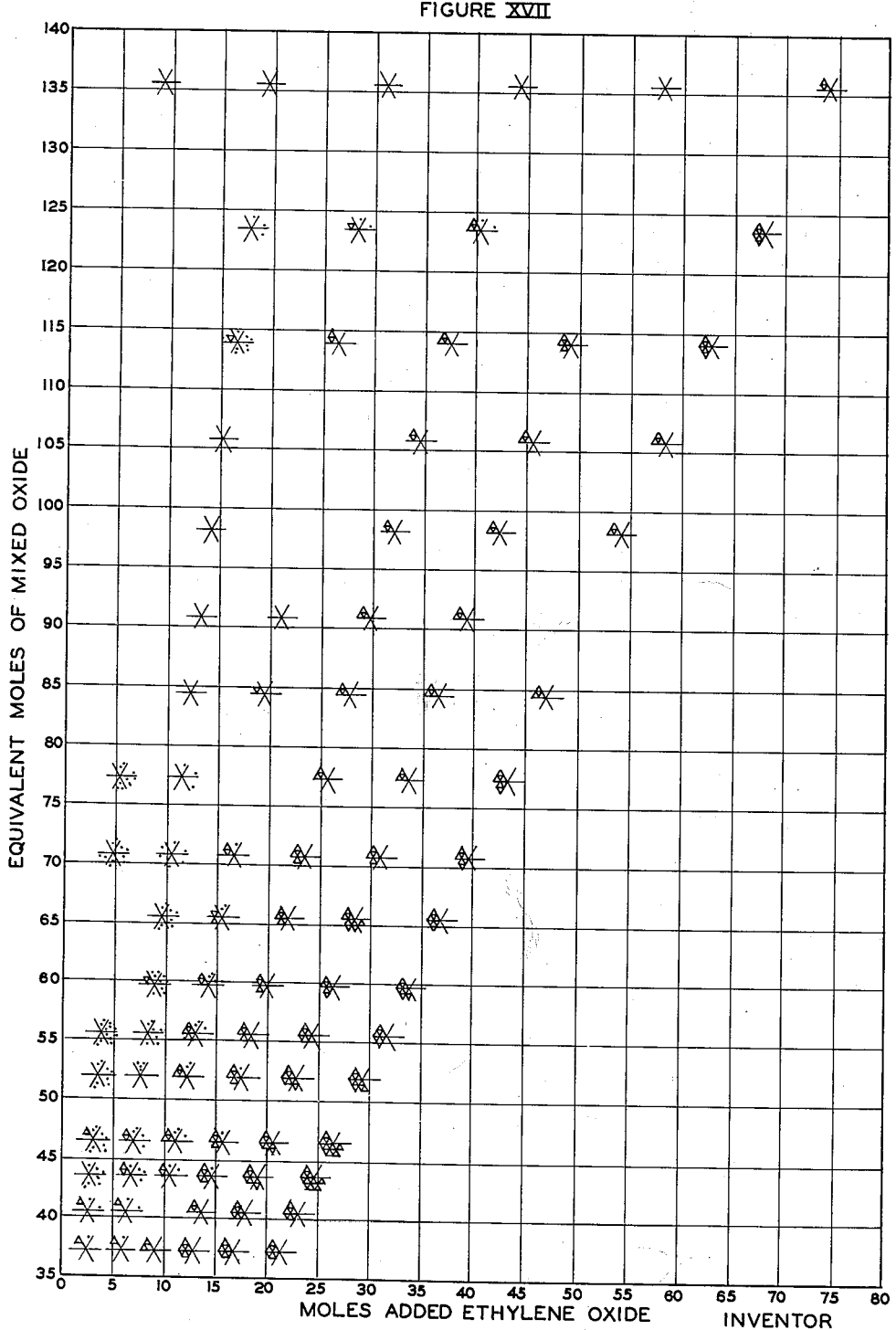

March 26, 1963 K. J. LISSANT 3,083,232
POLYALKYLENE GLYCOL BLOCK POLYMERS
Original Filed May 12, 1960 13 Sheets-Sheet 13
FIGURE XVIII
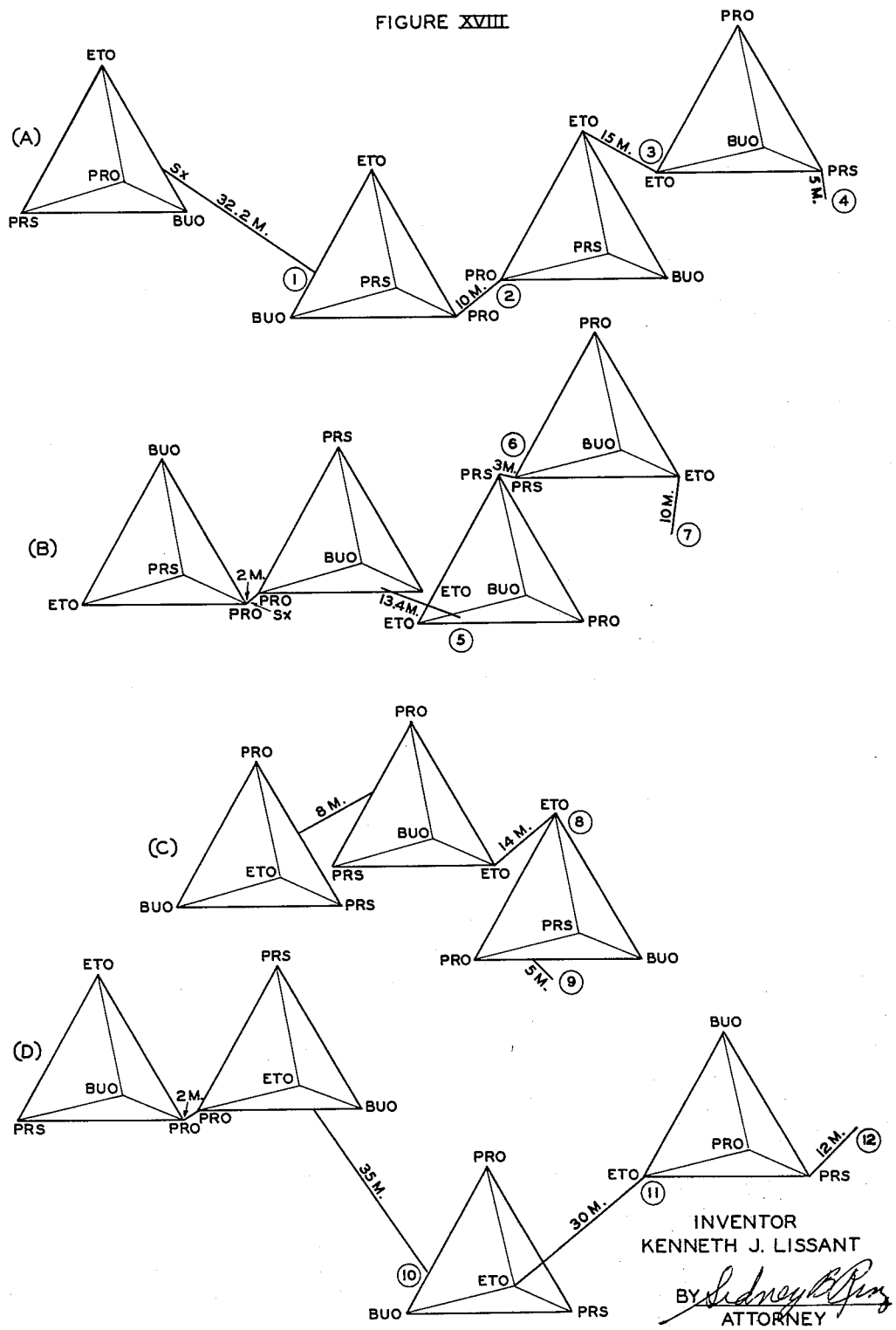
INVENTOR
KENNETH J. LISSANT

United States Patent Office 3,083,232
Patented Mar. 26, 1963

3,083,232
POLYALKYLENE GLYCOL BLOCK POLYMERS
Kenneth J. Lissant, St. Louis, Mo., assignor to Petrolite Corporation, Wilmington, Del., a corporation of Delaware
Original application May 12, 1960, Ser. No. 28,795. Divided and this application Sept. 5, 1961, Ser. No. 135,898
1 Claim. (Cl. 260—609)

This invention is concerned with a new, novel and useful method of displaying each possible member of a class of polymeric materials in such a way that their interrelationships are more readily discerned, a device by which this method may be conveniently employed, and certain new classes of polymeric materials as delineated by this method.

The device described herein and disclosed and claimed in the parent application, Serial No. 28,795, filed on May 12, 1960, of which this application is a division, is as follows:

(1) An analogue device to be employed in the delineation of members of related polymeric species comprising at least one selection figure and at least one polymerization figure arranged sequentially in a physical conformation so as to be analogous to a suitably selected non-commutative composition space of as many dimensions as may be required to delineate unambiguously the polymeric species in question, said selection figures comprising physical models of appropriate geometric figures suitably inscribed with a grid upon which the selected compositions may be displayed and said polymerization figures comprising physical models of dimensional grids upon which the compositions of the products of the polymerization processes may be displayed.

(2) A device to be used in displaying the relationships between the functional properties and the chemical constitution of members of related polymeric species comprising a variety of geometrical grids inscribed upon suitable supporting surfaces designated as "selection figures," a variety of geometrical grids inscribed on suitable supporting surfaces designated as "polymerization figures," and suitable means for arraying the selection figures and polymerization figures sequentially in a spacial relationship so as to be analogous to a non-commutative composition space of sufficient dimensions unambiguously to delineate the composition of the members of the polymeric species in question.

For purposes of clarity what is said hereinafter is divided into four parts. Part 1 is a general discussion of the types of chemical reactions under consideration. Part 2 is a mathematical discussion of the method of this invention. Part 3 is a description of the device of this invention and examples of the uses of the device and method. Part 4 describes certain new, novel and useful compositions revealed by the use of the device and method.

PART 1

Much of the phenomenal growth of the science of chemistry can be related to the development of suitable methods of notation for chemical compounds. Organic chemistry in particular was unable to advance rapidly until the concept of structural formulas supplanted the mere recitation of the number and kinds of atoms in a compound. One now recognizes that the geometrical configuration of a molecule is an integral part of its identity and that compounds with vastly different properties may be made from the same atoms by assembling them in different ways to produce isomers. As the number of atoms in a molecule increases the number of possible isomers becomes very large and the problem of tabulating, designating, and differentiating between isomers becomes staggering. This problem becomes particularly acute in the field of polymer chemistry. Here a reactive monomer is combined with itself or a suitable starting material to build up molecules of high molecular weight and great complexity. The properties of these polymers are functions of the starting material, the monomer composition, the reaction conditions, and the size and configuration of the final molecule. Where the reaction conditions are such that a cogeneric mixture is produced rather than a single species, the distribution of particular species in the mixture also affects the properties of the material. Thus it is clear that the number of individual materials that must be dealt with in the study of polymer chemistry is so large that it is almost impossible to array the data so that general properties and relationships can be seen. The great utility of the process and device herein described stems from the ability of the method to deal unambiguously with extremely large amounts of data. This method has been found particularly valuable in the study of alkylene oxide polymers and most of the discussion will be directed to this field of polymer chemistry. The method is not limited to this field, however.

In the mathematical discussion of the development and use of this method specific examples will be taken almost solely from the alkylene oxide polymers and for this reason a brief discussion of the chemistry of this class is given here.

Alkylene oxides have the general formula:

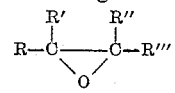

where R, R', R" and R'" may be, for example, hydrogen, an aliphatic radical, a cycloaliphatic radical, an aryl radical, etc. The R's may also be joined to form a cyclic structure. In cases where one or more of the R's contain an epoxide group, a diepoxide or a polyepoxide results. For the purposes of simplicity this discussion will consider only the materials with one epoxide group. This is not, however, to be considered as a limiting factor of the method.

Alkylene oxides will react with active centers of other organic or inorganic molecules to build up polyether chains of considerable length. Examples of materials which can be made to react with alkylene oxides are well known to the art. The generic reaction may be written:

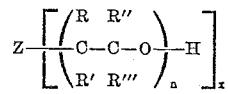

where $n$ is the number of monomer units in the chain and $x$ is the number of reactive sites in the starting molecule.

The relative reactivity of the chain terminal groups and of the base reactive sites with respect to the monomer will determine the positions and relative lengths of the chains. In almost all reactions of this type it is understood that a single pure compound is not produced. The reaction product is a "cogeneric mixture."

PART 2

In dealing with polymeric reactions of this type mathematically, it is possible to break the procedure into several distinct operations, as follows:

(1) Designation of starting material.
(2) Designation of reaction conditions.
(3) Step-wise reaction of monomer with starting material.
   (a) Selection of monomer composition.
   (b) Specification of number of units of monomer to be reacted with starting material.

The product resulting from step three above can then be used as the starting material for a new family of polymers by repeating steps two and three. This procedure can be repeated as often as desired. Each of the three above steps will now be discussed separately and certain terms defined.

(1) Designation of starting material. Mathematically this operation consists of selecting a member $S_x$, from the class of all materials or mixtures that are susceptible to oxyalkylation. These materials may be said to constitute a class, $S_1, S_2, S_3, S_4, \ldots S_x, \ldots S_n$ where the subscript refers to the chemical composition of the starting material. Examples of specific members of this large class are well known to the art, for example attention is called to alcohols, amines, carboxylic acids, phenols, mercaptans, etc.

(2) Designation of reaction conditions. It is well known that the type and amount of catalyst, the temperature, pressure, rate of addition and other factors may affect the composition of the final reaction mixture. For this reason it is necessary to specify the values of any parameters that can affect the course of the reaction. This is mathematically equivalent to selecting a function $F_{x(T,P,c\ldots)}$ from a general class of all possible conditions.

(3) Stepwise reaction of monomer with $S_x, F_x$.

(a) Selection of monomer composition.

The three most common 1,2-alkylene oxides are ethylene oxide, propylene oxide, and butylene (1,2 or 2,3) oxide. Also known are other mono-oxides such as octylene oxide, styrene oxide, cyclohexene oxide, etc. and also di- and poly-epoxides such as those referred to in U.S.P. 2,888,430.

These materials constitute a class: $M_1, M_2, M_3, \ldots M_x, \ldots M_n$. In the non-limiting case, any or all of the members of the class may be used singly or in combination to constitute the monomer mixture. In most cases a single monomer is used, however, mixtures of two monomers are known to the art. The commercial butylene oxide is usually a mixture of the 1,2 and 2,3 isomers. For purposes of illustration most of the following examples will deal with either ethylene oxide (EtO), propylene oxide (PrO), butylene oxide (BuO) with specific reference to the 1,2 isomer in commonly available technical pure form unless otherwise specified or mixtures of these monomers. It should be clear, however, that what is said hereinafter applies equally to other monomers and combinations. The monomer composition can be represented symbolically thus:

$$O_x(aM_1, bM_2, \ldots, yM_x)$$

where $O$ represents the polymerization steps and $M_1, M_2, \ldots M_x$ are the monomers in the mixture and $a, b, \ldots y$ are the proportions of each monomer. It follows that if the indices $a, b, \ldots, x$ are expressed as weight or mole percents, then $a+b+ \ldots +x=100$, and if the indices are expressed as decimal fractions then:

$$a+b+ \ldots x=1$$

Specifically if only ethylene oxide were used the notation would be M(EtO). If equal weights of ethylene and propylene oxide were mixed to form the monomer mixture the notation could be M(0.5 EtO, 0.5 PrO w./w.) where the indices are expressed as weight fractions. If equal moles of the two pure monomers were mixed then the designation could be M(0.5 EtO, 0.5 PrO m./m.). These two mixtures are obviously different. A simple mathematical calculation will show that M(0.5000 EtO, 0.5000 PrO m./m.) is equivalent to M(0.4314 EtO, 0.5686 PrO w./w.).

(b) Specification of number of units of monomer ($M_x$) to be reacted with $S_x, F_x$.

It now remains only to specify how much monomer should be reacted with the starting material. There are several units that can be used but the most common are weight of monomer per unit weight of $S_x$, moles of monomer per mole of $S_x$, and percent $M_x$ in final product. Each of these has certain advantages and disadvantages. It is my preference to express the amount of monomer or monomer mixture as moles of equivalent epoxide per mole of $S_x$. In the case of single monoepoxide monomers this is numerically equal to moles of monomer per mole of starting material.

On the basis of the above discussion it is now possible unambiguously to specify the composition of any particular oxyalkylation product in terms of the starting material, conditions, and kinds and amounts of monomer used. The general notation is:

$$S_x, F_x, O_1(aM_1, bM_2 \ldots yM_x)N_1,$$
$$O_2(a'M_1, b'M_2 \ldots y'M_4)N_2$$
$$\ldots O_n(a_nM_1 b_nM_2 \ldots y_nM_x)N_n$$

where $O_1, O_2 \ldots O_n$ represent successive oxyalkylation steps. As a specific example of this notation may be cited the material covered in U.S. Patent 2,674,619 to Lundsted and now sold commercially by the Wyandotte Chemical Company under the trade name Pluronic L–64. This material, according to the manfacturer, is made by adding ethylene oxide to a polypropylene glycol of molecular weight 1750 until the ethylene oxide portion represents 40% of the weight of the final molecule. In the above notation this material is regarded as the two step reaction product, where $S_x$ is water which is then reacted first with propylene oxide then with ethylene oxide. A polypropylene glycol of molecular weight 1750 is equivalent to adding about 30 moles of propylene oxide to one of water. If this represents 60% of the final molecular weight, the final molecular weight will be about 2900. This would require the addition of about 26 moles of ethylene oxide to the polypropylene glycol to produce the final product. Thus the notation would be:

$$H_2O, F_p, O_1(PrO\ 100\%\ m.)\ 30.17,$$
$$O_2(EtO\ 100\%\ m.)\ 26.51$$

where $F_p$ represents the reaction conditions as specified in the above cited patent.

A further example may be cited the material described in U.S. Patent 2,425,845 to Toussaint, et al. and sold commercially by Carbide and Carbon Chemical Company as Ucon 50HB 260. This material is made by reacting one mole of water with about 20 moles of a mixture of ethylene oxide and propylene oxide containing equal weights of each oxide. It is made by a one stage process and the notation is:

$$H_2O, F_u, O_1(0.5\ EtO,\ 0.5\ PrO\ w./w.)\ 20\ m.$$

where $F_u$ refers to the reaction conditions of the patent. Note that the units in which the mixture is expressed are indicated by w./w. to show a weight ratio and that the amount added is expressed as 20 m. to show that it is expressed in moles. Obviously, the units in which either the mixture ratio or the amount added could be changed without affecting the identity of the notation.

PART 3

It should be clear that the above described notation will unambiguously delineate any possible polyalkylene glycol polymer. It is not, however, in itself, useful in developing a useful picture of the whole field. The number of materials that can be synthesized from alkylene oxides is extremely large. As an example of the scope of the problem attention is called to an advertisement appearing in "Chemical Week" for February 6, 1960 on page 78. It says in part "when ethylene oxide reacts with an 'active hydrogen' compound like one of the alcohols, glycols, phenols, amines or organic acids, the new product generally contains a hydroxyl group which can, in turn, react with another molecule of ethylene oxide to form another new product. This chain reaction, subject to designed controls, offers unlimited possibilities in the development of new products.

Staggering Potential

"When you add to this the fact that you can use ethylene oxide alone, propylene oxide alone, and that you can use them in random mixtures or ordered blocks, you begin to see the infinite variety of products that alkylene oxides can spawn."

These facts have, in fact, given rise to literally hundreds of patents on various classes of oxyalkylated materials. The utility of my invention lies in the ability of my method and the device by which it may be employed to discriminate between individual members of a class and between classes and to so order and array them that they may be studied and comprehended in toto.

The process of this invention consists of a mapping technique wherein a suitable composition space is chosen and properties of members of a class of polymers are mapped in the space in such a way that their interrelationships are readily displayed. Mathematically this amounts to establishing a one-to-one correspondence between the individual members of a class of polymers and the individual points in an appropriately chosen composition space. For instance, all the possible mixtures of methyl alcohol and water can be represented by points on a line segment such as FIGURE I. In FIGURE I, A represents pure methanol and B represents pure water. The point, P, represents a mixture of water and methanol. The location of point P is determined by the proportions of the two components in the mixture. As point P approaches A the mixtures represented become richer in methanol. This particular composition space is one-dimensional, unambiguous, definitive, and commutative. It represents all possible mixtures, each point represents one and only one mixture, and each mixture can be made either by adding water to methanol or methanol to water. Mathematically this is the same as saying that point P may be approached from either direction without changing its meaning.

When the order in which a sequence of operations is performed affects the final result, the system is said to be non-commutative. The spaces employed in the practice of the method of this invention will, for the most part, be non-commutative. In most organic chemical syntheses the order in which the steps are performed determines the product obtained. Thus, it is clear that if one treats one mole of water with five moles of ethylene oxide and then with five moles of propylene oxide one obtains a different material than if we treat one mole of water first with five moles of propylene oxide and then with five moles of ethylene oxide.

In the method of this invention the appropriate composition space for the polymeric species under consideration is characterized as follows:

(1) $S_x$ and $F_x$ serve as indices to differentiate individual composition spaces which are otherwise mathematically identical.

(2) The spaces are fundamentally non-commutative in that each of the dimensions making up the space must be traversed in designated sequential order.

(3) Dimensional segments of the composition spaces are of two kinds, "selection figures," and "polymerization figures." In general, the non-commutative aspects of the space require traverse alternately through first a selection figure, then through a polymerization figure.

(4) The composition space contains one selection figure and one polymerization figure for each successive different oxyalkylation step required to produce the particular molecular species.

The one component polyglycols afford a good example of classes that are easily displayed in one-dimensional, noncommutative diagrams. FIGURE II shows a group of such composition spaces. FIGURES II–1 could be used to represent the class of polyethylene glycols. In this case the starting material is water and the synthesis of any member of the class is a one step process consisting of the addition of the desired amount of ethylene oxide under the appropriate conditions. Each point on the line represents a possible cogeneric mixture resulting from a reaction of this kind. All possible products can be represented by extension of the line to the right. If a reaction technique were to be used which resulted in pure compounds rather than mixtures, a non-continuous space such as FIGURE II–6 would be used to display the class since theoretical compositions with fractional mole additions would be impossible. In cases where cogeneric mixtures occur the number of moles added per mole of starting material is plotted and the distribution of actual species in the mixture is assumed to be set by $F_x$. The "selection figure" in these cases is the initial point of the line. The rest of the line constitutes the "polymerization figure."

FIGURES II–2 and II–3 could be used to display polypropylene glycols and polybutylene glycols. They differ from each other and FIGURE II–1 only in the selection figure point which represents a different reactive monomer. If a different starting material, e.g., an amine, were treated with ethylene oxide a similar space would be used but $S_x$ would be different. (FIGURE II–4.) It should be evident that FIGURE II–4 and FIGURE II–5 are essentially identical. Although many of these statements are obvious and trivial at the one-dimensional level, as more dimensions are used they are not as obvious. It should be remembered that the same principles apply to spaces of higher dimensionality. Note that the line segment of FIGURE I is bounded on each end while the lines of FIGURE II extend indefinitely in one direction. From each point in such a space as shown in FIGURE II a new family of materials may be generated by treating the product represented by any point on the line with varying amounts of a different reactive monomer. A new line segment is thus generated from each point on the original line and a plane is defined. FIGURE III shows how the Pluronics mentioned above can be represented in such a two-dimensional composition space. Note that this space is non-commutative in that one must first traverse the bottom of the plane until the proper amount of propylene oxide has been reached and then traverse "up" to the proper amount of ethylene oxide. Each point in the space must be reached by such a process and it is forbidden to "back up." This is equivalent to saying that depolymerization will not proceed in the reverse manner to polymerization.

A different type of two-dimensional space is shown in FIGURE IV. Here the materials to be represented are the Ucons of Carbide and Carbon. These materials are made in a one-step process by treating water with a mixture of propylene oxide and ethylene oxide. The composition of the mixture and the total equivalent moles of mixture added to water may be varied. The bottom of the figure is a line segment of the type shown in FIGURE I. This line is a "selection figure" for the monomer mixture to be used. The vertical dimension represents the number of equivalent moles of mixture added to the starting material. It is the polymerization figure. In this particular space we have delineated certain areas which represent the materials covered by the claims of U.S. Patent 2,754,271 to Kirkpatrick.

One of the useful aspects of this invention is the ease with which such information may be displayed and interrelationships between the scope of claims elucidated.

Note that FIGURE III is bounded on the "bottom" and "left" and extends indefinitely "upward" and to the "right." It represents one quadrant of an unbounded plane. FIGURE IV is bounded on three sides and extends "upward" indefinitely. Such spaces will be referred to hereinafter as "ribbon" spaces.

FIGURE V is another form of two-dimensional composition space. It serves as a map of all possible compounds that can be made from ethylene oxide, propylene oxide, and butylene oxide by two-step addition of the unmixed oxides. The center of the plane represents one mole of water (or other $S_x$, $F_x$). The three dark lines at 120° to each other serve to represent polyethylene glycol, polypropylene glycol, and polybutylene glycol. Each begins with a point selection figure of the specified oxide and is itself a polymerization figure for the pure polyglycol. The six triangular figures into which the plane is divided each represent one of the possible two-stage species of materials that can be obtained by treating a polyglycol with another oxide. The lower right hand triangle represents the same materials that are represented in FIGURE III, except that the coordinates are set at an angle of 60° instead of 90°. This example again shows the utility of this invention in displaying the relationships between related classes of compounds. Note that this figure is actually six separate figures arranged in a spatial relationship which illustrates the compositional relationships of the classes.

The same principles may be applied to generate composition spaces of three dimensions. Consider the class of materials produced by treating a phenol, stepwise, first with ethylene oxide, then propylene oxide, and then ethylene oxide again. The first stage materials are easily plotted in a space of the type shown in FIGURE II. The first two stages may be displayed in a space of the type shown in FIGURE III. All three stages may be mapped into a "cubic" space of the type sketched in FIGURE VI. This is an obvious extension of the technique.

Referring again to FIGURE V, note that each of the six, two-stage classes of materials may be treated with either of the other two oxides to produce a new family of materials. If one of these steps is represented as extending "up" from the plane of FIGURE V and the other "down," the hexagonal prism of FIGURE VII-a is generated. Since, as was noted above, the hexagon is actually composed of six triangles the prism may be considered to consist of twelve triangular prisms. To keep this relationship distinct, the prisms are caused to diverge slightly as they extend from the generating plane. This is illustrated in FIGURE VII-b. If one specifies that a starting material may be treated with either ethylene oxide, propylene oxide, or butylene oxide, step-wise, without mixing oxides, there are three possible one-stage classes, six two-stage classes, and twelve three-stage classes. FIGURE VIII shows how these twenty-one classes may be represented in one sort of three-dimensional composition space. This is only one of several equivalent assignments of selection figures that can be made. The method of traverse within this space is analogous to the chemical steps used to synthesize the represented materials. One must start at the center of the base hexagon. Here are specified $S_xF_x$. At this point a point selection figure requires one to choose one of the three oxides for the first addition step. With the oxide selected, polymerization is represented by traverse along one of the three solid lines. In FIGURE VIII if propylene oxide were selected the polymerization figure would extend "down diagonally to the right." When the desired amount of oxide has been added a point is defined. Here a selection of one of the other two oxides must be made. This is equivalent to deciding to go "right or left" from the line. If ethylene oxide is selected the polymerization traverse is into the triangular area labeled PE in FIGURE VIII. Again when the desired amount of oxide has been added a new point is defined. Again a selection must be made between two oxides and as the selected oxide is added to the two-stage product, the polymerization traverse is "up" or "down." It should be noted that a new $F_x$ may be specified at each addition stage if desired.

As another example, suppose it is wished to display all the possible polyglycols that can be made in a one-step process from ethylene oxide, propylene oxide and butylene oxide using either the single or unmixed oxides or any combination of mixed oxides. All possible monomer combinations can be displayed on a selection figure such as FIGURE IX. All possible mixtures of three oxides are provided for in the inner portion of the triangle, all mixtures of two oxides are assigned to the appropriate edge of the triangle, and the three pure oxides are assigned to the corners of the triangle. A prism can now be generated by assigning "equivalent moles of reactive monomer reacted with base material" to the "up" direction. This is illustrated in FIGURE X. The triangular base is a selection figure for the composition of monomer and the prism is the polymerization figure for the one-step process. The same technique may be used to display the reaction products of any other three reactive monomers. The starting material does not have to be water. Similarly, all possible mixtures of four reactive monomers may be displayed in and upon a tetrahedron. FIGURE XI shows how this may be done. The four "corners" represent the pure components, the edges the two-component mixtures, the faces the three-component mixtures and the body of the tetrahedron the four-way mixtures. Notice carefully that this is a selection figure for composition of reactive monomer—not a polymerization figure. Once the monomer composition has been selected from this figure a point in the figure has been defined. A new or "fourth" dimension is then assigned to equivalent moles of monomer reacted with $S_xF_x$. The four-dimensional space thus generated is the polymerization figure for this system. More will be said about poly-dimensional spaces later.

FIGURE XII represents another type of three-dimensional space. In this figure the base plane is a ribbon space of the type shown in FIGURE IV. Specifically, this ribbon represents the Ucons of U.S. Patent 2,425,845, which are made in a one-step process by reacting one mole of water with mixtures of propylene and ethylene oxide. The far left edge of the ribbon represents the polypropylene glycols and the far right edge the polyethylene glycols. If materials represented on this figure are further treated with either propylene oxide ("up") or ethylene oxide ("down") the materials may be displayed on the "slabs" thus generated.

Plane ADSP represents the Pluronics of U.S. Patent 2,674,619; plane BCVT the materials of patent application S.N. 677,982, filed August 13, 1957; and planes EFGH, JKQN, and MLOR are examples of materials of our copending application S.N. 28,216 filed of even date and assigned to the same assignee as the present invention.

At this point it should be noted that a given family of materials may be displayed in several different ways. For instance, the Pluronics are displayed on FIGURES III, V, VIII, and X. The method of display should be chosen which most conveniently represents the aspects of the problem under study.

It should be clearly understood that the "spaces" of this invention bear no relationship to "real" space. Terms such as "up," "down" "right," etc. have been used is discussing "directions." Any resemblance of these terms in composition spaces to their meaning in the three-dimensional space that we feel we live in is purely by way of analogy. In dealing with higher dimensional spaces, any tendency to associate them with aspects of "real" space is likely to lead to confusion. Multi-dimensional spaces can be used as tools without any concern for "where they are" or "where they go." Because of the conceptual difficulties encountered in dealing with multi-dimensional spaces, one useful aspect of our invention is a device whereby such concepts may be more easily displayed. Several poly-dimensional spaces will be discussed in conjunction with a description of the device of this invention in Part Three-A following.

PART 3-A

It is difficult enough to represent three dimensions in a two-dimensional sketch; to try to represent more than three dimensions is seldom practical. For that reason the device of this invention has been developed. Just as a slide rule embodies a table of logarithms in a simple device, so the device of this invention serves as a composition-space analogue of remarkable simplicity while possessing great versatility and utility.

The device in its preferred embodiment consists of a plurality of rigid transparent sheets bearing grids of various kinds and suitable means of arraying these sheets. I have found it convenient to construct the sheets from clear polymethylmethacrylate sheets and to scribe the grids thereon so that the scribed lines may be filled with a pigment or paint to make the lines of the grids more visible. Obviously glass or any other rigid, transparent material could be used and any convenient method of producing a grid thereon could be employed or in some instances wire grids may be used. The size of the sheets is not important except as it affects the convenience of the device. If portability is important, the size of the sheets can be reduced. Three different kinds of grids are usually employed, as illustrated in FIGURE XIII, a rectangular grid, a triangular grid, and a "ribbon" grid. Other grids may be employed as needed.

As an example of how this useful device is employed reference is made again to FIGURE XII. Suppose a study is being made of the cloud point of the materials displayed in FIGURE XII. Plane ABCD is represented by a sheet bearing a "ribbon" grid. Other sheets bearing rectangular grids are arrayed, by any suitable clamping means, at right angles to the ribbon sheet to represent such planes as EGHF, BCVT or JNQK. As the cloud points of specific members of the group of materials are determined they are written with wax pencil or other suitable means upon the appropriate sheet at the point which represents the composition of the specific material. When all the data has been transferred to the composition space, relationships which would be extremely difficult to detect from the tabular data can readily be seen. For instance, lines may be drawn between points of equal cloud point and so "iso-cloud point" lines, surfaces and volumes delineated. In fact any determinable property may be displayed on such a device and several properties simultaneously displayed by the use of different symbols or colors so that the variation of several properties with respect to composition may be studied at the same time. Optimal regions in the composition space for any property may thus be discovered and by determining where optimal regions for different properties overlap it is possible to determine the optimum composition for a combination of properties. Since the number of individual materials which may be prepared in a group such as this is virtually infinite it is necessary from a practical standpoint to prepare as few members of the class as possible and from them determine the specific members which have utility for a particular purpose. The use of this device makes the choice of individual compositions to be prepared much easier. The usual procedure is to prepare a small number of examples of the class, determine whatever properties of these members are pertinent to the problem at hand, and display these properties on the device of this invention. It is then usually possible to find "composition directions" which tend to maximize the properties. New materials can then be prepared which are located within the regions of the composition space where the properties maximize. These are then added to the display. The method of this invention thus greatly reduces the number of materials that must be prepared in an investigation.

This device is particularly useful in dealing with multi-dimensional composition spaces. Suppose, for example, that a group of polyglycols is made by starting with water and adding, step-wise, first ethylene oxide, then propylene oxide, then ethylene oxide again, then butylene oxide, then ethylene oxide again. This is five stages of addition and requires a five-dimensional composition space to display the materials in a formal, mathematically rigid, manner. However, the first three stages can be displayed easily on the device of this invention by arraying several rectangular grids, one above the other, to form a space of the type illustrated in FIGURE VI. The three-stage products can then be sorted into sub-classes, each class having the same number of moles of ethylene oxide added in the third step. Each of these classes will fall on a plane in the composition space represented by a grid in the device. If each of these planes is made the base of a new cubic space, the fourth step may be displayed. In the same manner planes may be selected in these spaces and the fifth step displayed in a new set of cubic spaces. Alternatively, a "line" may be selected in the three-stage cube and this line made the base line for a new cubic space which can be used to display the fourth and fifth steps.

As the complexity of the system under consideration increases, the utility of the method and device of this invention become even greater. The ease with which complex systems may be represented and the clarity with which they may be displayed makes it possible to discover relationships between composition and function which could be detected only with great difficulty by other methods.

A specific example of the great utility of this device and method in displaying data consider Table VI, Examples 1–261 of copending application 28,216, filed on even date and assigned to the same assignee as the present invention.

In this instance 261 specific examples of compositions are cited. This takes 12 typewritten pages just to cite the compositions of the examples. The solubilities of these examples are also cited. This takes 31 more typewritten pages. All of this data is displayed by the method of this invention in FIGURES XV, XVI, and XVII. In addition, data on the base materials are contained in FIG. XV. These three figures contain nearly 15,000 separate pieces of data, each of which can be read directly from the display. The three figures were developed in the following manner. The device of this invention was arrayed to conform to a composition space of the type shown in FIGURE XII. FIGURE XV corresponds to the plane EFGH of FIGURE XII, FIGURE XVI corresponds to the plane JKQN, and FIGURE XVII corresponds to the plane MLRO. The tables in the copending application 28,216 cite first the composition of each example and then the solubility.

Solubility was determined in distilled water and in kerosene at concentrations of 1%, 5%, 10% and 50% by volume as follows:

Eight test tubes were placed in a rack and the appropriate amount of each sample and water or paraffinic kerosene was added to produce 20 ml. of solution in each test tube. The kerosene used in this and all other tests had an aromatic content of from 4% to 13% and an olefin content of from 3% to 5%. The balance was saturated petroleum hydrocarbons. The distillation data for the kerosene is set out below:

| Distillation | Temperature, °F. at which percentages shown have boiled off |
|---|---|
| Initial boiling point | 350 |
| 10% | 390 |
| 20% | 400 |
| 50% | 420 |
| 90% | 470 |
| End point | 520 |

The rack, with tubes, was then placed in a water bath at 25° C. The solutions were allowed to reach bath temperature, shaken, and allowed to stand in the bath for 5 minutes more. Each tube was then inspected for solubility properties. If the solution was clear and bright it was recorded as soluble. If two phases were present it was recorded as insoluble. In instances where the solution was clear and bright but there seemed to be a small amount of a second phase it was recorded soluble if the second phase did not exceed 10% of the volume of the compound added.

For each individual composition the solubility tests yield 48 separate data, all of these data may be displayed of the device of this invention by the use of an appropriate symbol system. One way this may be done is illustrated in FIGURE XIV. The symbol is based on six equilateral triangles grouped into a hexagon. Each triangle represents one temperature at which solubility was determined. Starting from the upper left hand triangle of the hexagon and proceeding counter-clockwise, the triangles represent the solubilities at 25° C., 35° C., 45° C., 55° C., 65° C., and 75° C. Each triangle is further subdivided into four smaller triangles. Each of these four triangles represents a different concentration of the material under test, specifically 1%, 5%, 10% and 50%. If the material under test is soluble in water at the specified concentration, the concentration triangle is drawn in. If not it is omitted. If the material is soluble in kerosene, a dot is placed in the center of the appropriate concentration triangle. In this manner an unambiguous symbol can be generated for each possible solubility profile. These symbols can then be mapped onto the proper composition space representation using the device of this invention.

FIGURES XV, XVI, and XVII were generated by placing the appropriate solubility symbol for each example at the point in the figure that corresponds to its composition in the composition space. Thus it is possible to condense 43 pages of tables into four figures. Furthermore, by arraying the figures in the proper spacing relationship to each other an example of the device of this invention is obtained which makes it possible to examine the variation of solubility with composition. "Regions" of water solubility or oil solubility can be easily mapped and transition zones delineated. Examples of related composition are displayed in proximity to each other and thus may be easily compared. Comparable evaluation of the data directly from the tables is almost impossible.

Consider a system where the selection figure is the tetrahedron illustrated in FIGURE XI. Let the four reactive monomers, A, B, C and D be chosen from the class consisting of materials of the type:

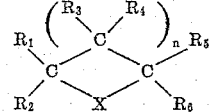

where $R_1$, $R_2$, $R_3$, $R_4$, $R_5$, and $R_6$ are alkyl, cycloalkyl, aryl, substituted aryl radicals, hydrogen atoms, etc.; where $n$ is zero or one; and where X is an oxygen, sulfur, phosphorous, an imino group i.e.

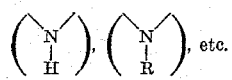, etc.

Consider further the general class of polymers which may be represented by a multi-step system where each polymerization step is preceded by a selection figure of the type shown in FIGURE XI. Simple calculation will show that there are 15 sub-classes for one stage of polymerization and, in general, $15^n$ subclasses for $n$ stages of polymerization. This means that a five-stage polymer can belong to one of at least 750,000 subclasses. While nothing is to be gained by listing these subclasses in detail, it should be pointed out that the method and device of this invention make it entirely practical and possible to do so. Furthermore, any specific polymer can be easily assigned to its proper subclass and its relationship to other classes easily displayed.

As a specific example, I will consider the system where, in the selection figure of FIGURE XI, A is ethylene oxide, B is 1,2-butylene oxide, C is propylene oxide, and D is propylene sulfide. Obviously what is said hereinafter applies equally well to any other combinations of reactive monomers.

Table I lists a group of polymeric materials which fall in this system. For simplicity $S_x$ in this case is taken as water and only the first four polymerization stages are considered.

TABLE 1

| Ex. | Step I | | Step II | | Step III | | Step IV | |
| --- | --- | --- | --- | --- | --- | --- | --- | --- |
| | Monomer composition | Moles [1] added | Monomer composition | Moles [1] added | Monomer composition | Moles [1] added | Monomer composition | Moles [1] added |
| 1 | EtO/BuO, 7/3, w/w | 32.2 | | | | | | |
| 2 | do | 32.2 | PrO 100% | 10 | | | | |
| 3 | do | 32.2 | do | 10 | EtO 100% | 15 | | |
| 4 | do | 32.2 | do | 10 | do | 15 | PrS [2] 100% | 5 |
| 5 | PrO 100% | 2 | EtO(PrO)BuO, 6/2/2, w/w/w | 13.4 | | | | |
| 6 | do | 2 | do | 13.4 | PrS [2] 100% | 3 | | |
| 7 | do | 2 | do | 13.4 | do | 3 | EtO 100% | 10 |
| 8 | PrO/PrS, 1/1, w/w | 8 | EtO 100% | 14 | | | | |
| 9 | do | 8 | do | 14 | PrO/BuO, 2/1, w/w | 5 | | |
| 10 | PrO 100% | 2 | PrO/BuO, 3/7, w/w | 35 | | | | |
| 11 | do | 2 | do | 35 | EtO 100% | 30 | | |
| 12 | do | 2 | do | 35 | do | 30 | PrS [2] 100% | 12 |

[1] Moles based on oxirane equivalents.
[2] PrS means propylene sulfide.

PART 4

In the course of perfecting the method and device of this invention it was apparent that it was also useful for disclosing heretofore uninvestigated types of polymers. For instance, mixed polymers employing mixtures of more than two reactive monomers do not seem to be well known to the art. Also, while multi-block polymers are known in the polyalkylene glycol field, multi-mixed-block polymers have received little attention.

Many of these classes of materials have even greater utility than the well known classes of materials. Certain of these new, novel, and useful classes of materials are claimed as one important aspect of this invention. For purposes of brevity, a tedious recitation of specific examples will be avoided and the scope of the claims will be defined by employing the subject method and device.

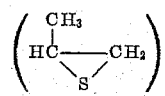

These materials, and other variations shown herein, among other things, can be employed for the uses disclosed in application S.N. 28,216 filed of even date and assigned to the same assignee as the present invention.

FIGURE XVIII shows how the method and device of this invention may be used to show the inter-relationships between individual members of related subclasses. FIGURE XVIII—A begins with a selection figure wherein the 7/3, w./w. ratio of mixed ethylene oxide—butylene oxide is selected and then 32.2 equivalent moles of this mixture are reacted with one mole of water to produce Example 1 of Table I. The next selection tetrahedron in the chain shows the selection of unmixed propylene oxide as the next reactant. Ten moles of this are added to one mole of Example 1 to obtain Example 2. The next selection tetrahedron shows the selection of unmixed ethylene oxide as the next reactant. Fifteen moles of this are reacted with one mole of Example 2 to obtain Example 3. The last selection tetrahedron in the chain shows the selection of unmixed propylene sulfide as the final reactant. Five moles of this are reacted with one mole of Example 3 to obtain Example 4. In a similar manner FIGURE XVIII—B shows the relationships between Examples 5, 6 and 7 of Table I; FIGURE XVIII—C shows the derivation of Examples 8 and 9; and FIGURE XVIII—D shows the derivation of Examples 10, 11, and 12.

It can be easily seen that the method and device of this invention make it possible to select and depict unambiguously the fifteen specific subclasses involved in the examples of Table I from the several thousand possible subclasses without a laborious tabulation of all possible classes. It should also be noted that many variations of the recited examples are made immediately apparent by study of FIGURE XVIII. This predictive capacity of the invention is one of its most useful aspects.

In the examples of Table I and FIGURE XVIII each selection figure involves the same four reactive monomers. It is entirely possible to change both the type of selection figure and the combinations of reactive monomers depicted in the selection figures in constructing an array to depict a particular series of polymers. The selection figure type and the assignment of reactive monomers to a selection figure may be varied as desired for purposes of clarity, brevity, or to emphasize specific interrelationships.

An analogous system to the one depicted in FIGURE XVIII may be constructed where instead of a sulfur analogue a material such as ethylene imine or one of its homologs is used. Also more than one sulfur analogue or imine type reactant may be used in a series. Any or all of the alkylene oxides may be omitted and only sulfur, nitrogen, or other analogs used.

This method and invention is not limited in its use to reactive monomers of the alkylene oxide type. Actually the method and device is equally useful in depicting the compositions of many series of polymers, for example polyvinyl chloride, polyethylene, polypropylene, polysilane, polysiloxanes, polytetrafluoroethylene, poly esters, etc.

Having thus described my invention, what I claim as new and desire to obtain by Letters Patent is:

A polyalkylene glycol block polymer derived from both alkylene oxide and alkylene sulfide, said polymer containing at least one block derived from the class consisting of alkylene sulfide and mixtures of alkylene sulfides and alkylene oxides.

References Cited in the file of this patent

UNITED STATES PATENTS 2,392,402    Patrick _____ Jan. 8, 1946
2,828,318    Reynolds _____ Mar. 25, 1958